US011026424B2

(12) United States Patent
Koehler et al.

(10) Patent No.: US 11,026,424 B2
(45) Date of Patent: Jun. 8, 2021

(54) TEXTURIZED INSECTICIDAL FORMULATION

(71) Applicants: University of Florida Research Foundation, Inc., Gainesville, FL (US); Philip G. Koehler, Gainesville, FL (US); Roberto M. Pereira, Gainesville, FL (US); Christopher D. Batich, Gainesville, FL (US)

(72) Inventors: Philip G. Koehler, Gainesville, FL (US); Roberto M. Pereira, Gainesville, FL (US); Christopher D. Batich, Gainesville, FL (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 0 days.

(21) Appl. No.: 16/097,934

(22) PCT Filed: May 25, 2017

(86) PCT No.: PCT/US2017/034500
§ 371 (c)(1),
(2) Date: Oct. 31, 2018

(87) PCT Pub. No.: WO2017/205636
PCT Pub. Date: Nov. 30, 2017

(65) Prior Publication Data
US 2019/0142003 A1 May 16, 2019

Related U.S. Application Data

(60) Provisional application No. 62/341,382, filed on May 25, 2016.

(51) Int. Cl.
| | | |
|---|---|---|
| *A01N 43/40* | (2006.01) | |
| *A01N 53/00* | (2006.01) | |
| *A01M 1/20* | (2006.01) | |
| *A01N 25/04* | (2006.01) | |
| *A01N 25/10* | (2006.01) | |

(52) U.S. Cl.
CPC ........... *A01N 43/40* (2013.01); *A01M 1/2016* (2013.01); *A01N 53/00* (2013.01); *A01N 25/04* (2013.01); *A01N 25/10* (2013.01)

(58) Field of Classification Search
CPC ..... A01M 1/2016; A01N 43/40; A01N 53/00; A01N 25/04; A01N 25/10
See application file for complete search history.

(56) References Cited

U.S. PATENT DOCUMENTS

| | | | | |
|---|---|---|---|---|
| 5,626,859 A | * | 5/1997 | Fitch | A01N 25/24 424/405 |
| 2007/0092583 A1 | | 4/2007 | Clarot | |
| 2009/0120328 A1 | * | 5/2009 | Michael | B82Y 30/00 106/481 |
| 2013/0123104 A1 | * | 5/2013 | McKnight | A01N 25/02 504/206 |
| 2013/0338223 A1 | | 12/2013 | Reid et al. | |
| 2014/0107057 A1 | | 4/2014 | Cassayre et al. | |
| 2014/0187424 A1 | * | 7/2014 | Norton | A01N 53/00 504/101 |

FOREIGN PATENT DOCUMENTS

| | | | | |
|---|---|---|---|---|
| WO | WO1997034478 A1 | * | 9/1997 | |
| WO | WO-2011145667 A1 | * | 11/2011 | ............. A01N 25/34 |
| WO | WO-2014186336 A1 | * | 11/2014 | |

OTHER PUBLICATIONS

English translation of WO1997034478A1. Translated by Google Patents on Sep. 14, 2020. (Year: 2020).*
Vinensia "List and Characteristic of Suspending Agents Used for Suspension" Dec. 2011, p. 1 para[0001] Retrieved from http://formulation.vinensia.com/2011/12/list-and-characteristic-of-suspending.html on Jul. 24, 2017 (Jul. 24, 2017).
Industrial Degreasers "The Benefits of an Acetone Cleaner" Mar. 28, 2013 (Mar. 28, 2013) p. 1 para[0002] Retrieved from https://ecolink.com/info/benefits-of-acetone-cleaner/ on Jul. 24, 2017 (Jul. 24, 2017).
Jenkins et al. "Antioxidants and Free radicals" Jun. 1996, p. 1 para[0002] Retrieved from http://www.rice.edu/-ienky/sports/antiox.html on Jul. 25, 2017 (Jul. 25, 2017).
Nanomold Coating "5 Major Advantages to Using Plastic Injection Molding for the Manufacturing of Parts" Sep. 11, 2014 (Sep. 11, 2014) p. 1 para[0003]-[0005] retrieved from http://nanomoldcoating.com/5-major-advantages-to-using-plastic-injection-molding-for-the-manufacturing-of-parts/ on Jul. 25, 2017 (Jul. 25, 2017).
Kam Charan "Fumed Silica for Various Applications-Performance Based" Jan. 2012, p. 1 para[0001] Retrieved from http://www.ramcharan.org/pdf/Fumed%20Silica.pdf on Jul. 25, 2017 (Jul. 25, 2017).
PCT Search Report and Written Opinion from co-pending, related PCT Application No. PCT/US17/34500, dated Aug. 29, 2017.

* cited by examiner

*Primary Examiner* — Doan T Phan
(74) *Attorney, Agent, or Firm* — Thomas|Horstemeyer, LLP

(57) ABSTRACT

Compositions, formulas, methods of making, mixing and applying insecticide formulations to different surfaces such as but not limited to interior surfaces of ovitraps, on walls and on chips and tiles to produce a texturized surface to allow for better transfer of the insecticidal active ingredients to insects, such as mosquitoes and the like, which land on or crawl on the surfaces, resulting in faster insect mortality rates. The texture of the insecticidal residue provides better transfer of the insecticidal active ingredients to insects that land on or crawl on the surface, resulting in faster insect mortality. The textured residue also enhances desirable surface characteristics for landing of mosquitoes and potentially other insects.

16 Claims, 2 Drawing Sheets

FIG. 2

Flow chart for preparation of formulations

100      Weigh component

200      Add all components except acetone to container

300      Add about ¼ of the acetone and shake well to get polymer and silica well dissolved/mixed into the acetone 400      Add remaining acetone and mix 500      During application of the formulation maintain the formulation under agitation to prevent settling of the silica

TEXTURIZED INSECTICIDAL FORMULATION

GOVERNMENT LICENSE RIGHTS

This invention was made with Government support under USDA-ARS contract 58-0208-3-001 awarded by the U.S. Department of Agriculture. The government has certain rights in this invention.

CROSS-REFERENCE TO RELATED APPLICATIONS

This application is a National Phase Application of PCT Application No. PCT/US2017/034500, filed May 25, 2017, which claims the benefit of priority to U.S. Provisional Patent Application Ser. No. 62,341,382 filed May 25, 2016, which applications are incorporated by reference in their entireties.

FIELD OF INVENTION

This invention relates to insecticides, and in particular to compositions, formulas, methods of mixing and applying insecticide formulations to different surfaces such as but not limited to interior surfaces of ovitraps, on walls and on chips to produce a texturized surface to allow for better transfer of the insecticidal active ingredients to insects, such as mosquitoes and the like, which land on or crawl on the surfaces, resulting in faster insect mortality rates to

BACKGROUND AND PRIOR ART

Ovitraps have been used over the years for the treatment of mosquitoes and the like. However, most treatments result in smooth surfaces which have limitations to both for the release of the insecticide and a surface for mosquitoes to land on and traverse.

Thus, the need exists for solutions to the above problems with the prior art.

SUMMARY OF THE INVENTION

A primary objective of the present invention is to provide compositions, formulas, methods of mixing and applying insecticide formulations to different surfaces such as but not limited to interior surfaces of ovitraps, on walls and on chips to produce a texturized surface to allow for better transfer of the insecticidal active ingredients to insects, such as mosquitoes and the like, which land on or crawl on the surfaces, resulting in faster insect mortality rates.

A secondary objective of the present invention is to provide compositions, formulas, methods of mixing and applying insecticide formulations to different surfaces such as but not limited to interior surfaces of ovitraps, on walls and on chips to produce a texturized surface to enhance desirable surface characteristics for landing of mosquitoes and potentially other insects.

An insecticidal composition for treating surfaces, can include a texturizing agent, a polymer mixture for suspending the texturing agent within, and a solvent for dissolving the textured agent suspended in the polymer mixture, and wherein the composition is useful to form a texturized surface to treat insects, such as mosquitoes.

The texturizing agent can include fumed silica. The polymer can include an Iso-butyl-methacrylate. The solvent can include acetone.

The insecticidal composition can further include Pyriproxyfen. The insecticidal composition can further include Permethrin.

A method of making a texturized surface with an insecticide composition, can include the steps of preparing an insecticidal composition mixture by mixing a texturing agent with a polymer and a solvent for dissolving the textured agent, and forming a texturized surface on an object.

The forming step can include spraying a surface of the object. The forming step can include painting a surface of the object. The forming step can include etching a surface of the object.

The forming step can include forming the texturized surface by injection molding the mixture with a plastic.

The object being treated can include an interior surface of an ovitrap. The object can include a surface of a chip. The object can include a ceramic tile surface.

Further objects and advantages of this invention will be apparent from the following detailed description of the presently preferred embodiments which are illustrated schematically in the accompanying drawings.

BRIEF DESCRIPTION OF THE FIGURES

FIG. 2 is a flow chart of the steps for preparation of the novel formulations.

DESCRIPTION OF THE PREFERRED EMBODIMENTS

Figure 1:
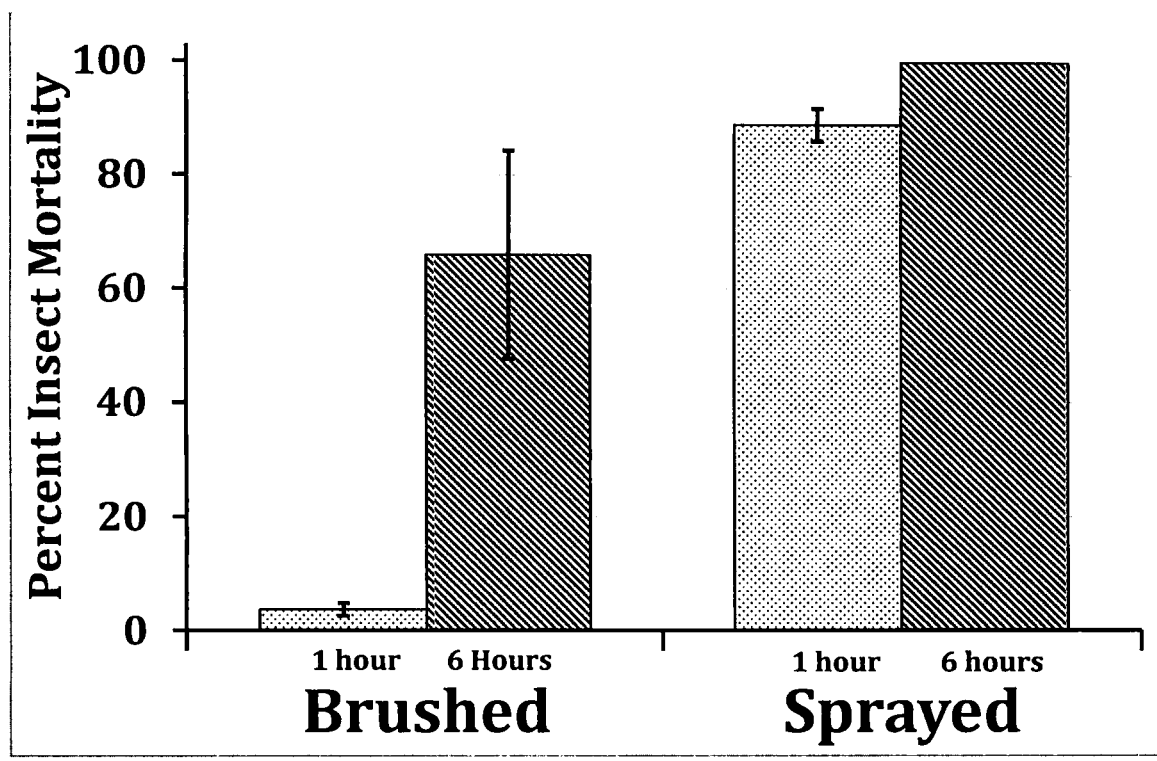
FIG. 1 is a graph showing percent of insect mortality versus brushed and sprayed surface insecticide treatments

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

This application can be used with previous applications of the assignee that include U.S. patent application Ser. No. 15/048,604 filed Dec. 19, 2015, which is a Divisional of U.S. patent application Ser. No. 14/204,524, filed Mar. 11, 2014, now U.S. Pat. No. 9,295,246, which claims the benefit of priority to U.S. Provisional Patent Application Ser. No. 61/777,766 filed Mar. 12, 2013. The entire disclosure of each of the applications listed in this paragraph are incorporated herein by specific reference thereto.

The invention can be used with treating different objects such as ovitraps, and chips, and the like, referred to in the parent patent applications, in addition to ceramic tile materials, and plastics as described below.

The invention includes an insecticide formulation containing a texturizing agent (fumed silica) suspended in a mixture of a polymer (Isobutyl-methacrylate) dissolved in a solvent (acetone). When applied with a spray nozzle, the formulation dries rapidly over surface producing a texturized residue.

The texture of the insecticidal residue provides better transfer of the insecticidal active ingredients to insects that land on or crawl on the surface, resulting in faster insect mortality. The textured residue also enhances desirable surface characteristics for landing of mosquitoes and potentially other insects. The polymer both serves to support for the texturizing agent, and to control the release of the insecticide active ingredient, providing longer-lasting residues.

Tables 1 and 2 show insecticidal compositions for treating surfaces of objects with fumed silica. Table 1 and 2 have similar compositions with Table 1 additionally comprising Permethrin.

TABLE 1

| Component | Component ID | grams w/acetone For 1 liter | Preferred amnt | Range |
| --- | --- | --- | --- | --- |
| Pyriproxyfen | 95737-68-1 | 0.084 | 0.01% | 0.10 to 0.005% |
| Permethrin | 52645-53-1 | 5.894 | 0.70% | 1.0 to 0.5% |
| Fumed Silica | 7631-86-9 | 8.415 | 1.00% | 3.0 to 0.5% |
| Polymer (Iso-buthyl-methacrylate) | 9011-15-8 | 42.073 | 5.00% | 7.0 to 1.0% |
| Acetone | 67-64-1 | 785.000 | 93.29% | 88.9 to 97.095% |
| Total | | 841.462 | 100.00% | |

TABLE 2

| Component | Component ID | grams w/acetone For 1 liter | Preferred amnt | Range |
| --- | --- | --- | --- | --- |
| Pyriproxyfen | 95737-68-1 | 0.084 | 0.01% | 0.10 to 0.005% |
| Fumed Silica | 7631-86-9 | 8.352 | 1.00% | 1.0 to 0.5% |
| Polymer (Iso-buthyl-methacrylate) | 9011-15-8 | 41.760 | 5.00% | 7.0 to 1.0% |
| Acetone | 67-64-1 | 785.000 | 93.99% | 91.9 to 98.495% |
| Total | | 835.195 g | 100% | |

Tables 1 and 2 represent the formulations used in the tiles (formulation without the adulticide permethrin), and the formulation used in the ovitraps (DDALO, or 00-ZZZero) which contains both the larvicide (pyriproxyfen) and the adulticide (permethrin).

Each of the percent amounts referenced in Tables 1 and 2 can each be approximately those listed amounts and include those exact listed percent amounts.

Two different formulations can be necessary because the tiles only require the larvicide because they are added to bodies of water to prevent development of the mosquito larvae (which do not cause any problem in terms of disease transmission) into adult mosquitoes (which can transmit the diseases. The ovitraps are coated internally with the formulation containing both active ingredients because adult females mosquitoes that come in to lay eggs inside the traps are killed with the adulticide while any larvae that may develop in the water are killed by the larvicide before they become adults.

FIG. 1 is a graph showing percent of insect mortality versus brushed and sprayed surface insecticide treatments. FIG. 1 shows the importance of spraying the formulation as opposed to applying it by crushing or other method for deposition of the formulation on a surface. When spayed, the formulation dries quickly and forms a rougher deposit on the surface due to the quick volatilization of the carrier (acetone) and the retention of the silica particles on a structured polymer deposit.

With sprayed formulation mortality occurs sooner (greater 1-h mortality), and reaches higher levels (Greater 6-h mortality).

FIG. 2 is a flow chart of the five main steps for preparation of the novel formulations.

Step 1(100), weigh component,

Step 2(200) add all components except acetone to the container.

Step 3(300) add about ¼ of the acetone and shake well to get polymer and silica well dissolved/mixed into the acetone.

Step 4(400) add remaining acetone and mix.

Step 5(500) during application of the formulation, maintain the formulation under agitation to prevent settling of the silica.

The texturized surface in a preferred embodiment can be used with mosquitoes. The microstructures and nanostructures of a mosquito's foot can have a length of about 2-3 uM, a width of about 1 uM, and a thickness varying from about 200 nm to about 500 nm, with the diameter of the seta ranges from about 200 nm to about 250 nm. See Wu and Kong, Micronanostructures of the scales on a mosquito's legs and their role in weight support, Physical Review E 76, 017301, pages 1-4, The American Physical Society, 2007.

The invention can be used to form a texturized surface can include silica particles having structures below approximately 100 uM would be best to use (<approximately 0.10 mm). The subject invention structures were agglomerates of approximately 10 uM with substructures approximately 1 uM or less. In the opinion of the inventors, a very small roughness would be best. Fumed silica would be preferred particles to be used.

Additional materials which can provide such small features can further include carbon black and fine features on larger structures like cotton fibers or wood bark, or rice hulls.

Many methods can be used to produce the textured surface. Spraying and painting and brushing the surface with the composition mixture can be done.

Spraying the inside of an ovitrap type container, or surface of a chip, and the like, with the solvent mix containing polymer and particles would be most likely to produce the finely textured surface.

Additionally, etching the surface with a plasma or corona discharge, or even an ozone exposure would create a rough surface. Still furthermore, sand-blasting the surface can also be accomplished.

Sand blasting is one of several abrasive blasting methods where a hard material is rapidly driven against a softer material by use of a pressurized vehicle such as air or water. It causes removal and deformation of the soft material's surface layer. Metal, glass beads or ceramics can be used.

Additional methods such as but not limited to ion etching are also possible, and would require vacuums, and the like. For polymers like polylactic acid, a solvent such as chloroform may also be used to etch the surface.

Molding the texturized surface can also be accomplished. For example, injection molding is often used to make containers, but more often injection blow-molding can be used. The later method uses air or nitrogen to expand the soft plastic, and does not put as much pressure on the surface as a mold would. Hence, particles incorporated in the plastic can be exposed to some extent on the inner surface. In some cases, they would be covered by a plastic layer and not have the very fine structure with features the size of a mosquito foot part. The utility would depend on particle loading, processing temperature and other factors.

With injection molding, the container or chip, and the like, can be made of many plastics, but the most common ones are very slowly degrading (polyethylene, polypropylene, polyethylene terephthalate, polyvinyl chloride or copolymers like EPDM).

Since it can be beneficial to have the device degrade when no longer effective or needed, one could make the bottle of a degradable plastic like poly-L-lactic acid (PLLA). This polymer is modifiable by mixing in other monomers (D-lactide, L-glycolide, caprolactone) or agents to speed or slow degradation like solid acids, bases or buffers.

Almost any solid or porous material can be able to carry a slow-release formulation.

Chips, such as but not limited to pebbles and the like, can be made of macroporous polymer beads or polystyrene or other polymers, porous ceramics, clays, cements or agglomerates or porous metals. Fiber mats, such as cloth, can also hold the polymer/larvicide composition for slow release applications.

Additionally, additives such as anti-oxidants, such as but not limited to Butylated hydroxytoluene (BHT) and Vitamine E (Alpha-Tocopherol or D-alpha-Tocopherol).

The additives would be used to prevent the breakdown of any of the active ingredients when the active ingredients are mixed or stored.

The terms "approximately" and "about" can be +/−10% of the amount referenced. Additionally, preferred amounts and ranges can include the amounts and ranges referenced without the prefix of being approximately.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. An insecticidal composition consisting of:
   a texturizing agent;
   an insecticide active ingredient;
   a polymer, wherein the polymer is poly(isobutyl methacrylate); and
   a solvent,
   wherein the total amount of the insecticide active ingredient and polymer is from 1.005 weight percent to 8.1 weight percent of the composition.

2. The insecticidal composition of claim 1, wherein the texturizing agent comprises fumed silica.

3. The insecticidal composition of claim 1, wherein the solvent comprises acetone.

4. The insecticidal composition of claim 1, wherein the insecticide active ingredient comprises pyriproxyfen.

5. The insecticidal composition of claim 1, wherein the insecticide active ingredient comprises permethrin.

6. The insecticidal composition of claim 1, wherein the insecticide active ingredient comprises pyriproxyfen and permethrin.

7. The insecticidal composition of claim 1, wherein the composition forms a texturized surface, and the texturized surface includes structures of less than 10 mm.

8. The insecticidal composition of claim 1, wherein the texturizing agent comprises fumed silica and the solvent comprises acetone.

9. The insecticidal composition of claim 8, wherein the insecticide active ingredient comprises pyriproxyfen, permethrin, or a combination thereof.

10. The insecticidal composition of claim 1, wherein the polymer is in the amount of 1 weight percent to 7 weight percent of the composition.

11. The insecticidal composition of claim 1, wherein the polymer is in the amount of 1 weight percent to 7 weight percent of the composition and the insecticide active ingredient comprises pyriproxyfen in the amount of 0.005 weight percent to 0.10 weight percent of the composition.

12. The insecticidal composition of claim 11, wherein the texturizing agent comprises fumed silica and the solvent comprises acetone.

13. The insecticidal composition of claim 1, wherein the polymer is in the amount of 1 weight percent to 7 weight percent of the composition and the insecticide active ingredient comprises pyriproxyfen in the amount of 0.005 weight percent to 0.10 weight percent of the composition and permethrin in the amount of 0.5 weight percent to 1.0 weight percent of the composition.

14. The insecticidal composition of claim 13, wherein the texturizing agent comprises fumed silica and the solvent comprises acetone.

15. The insecticidal composition of claim 1, wherein the polymer is in the amount of 1 weight percent to 7 weight percent of the composition, the insecticide active ingredient comprises pyriproxyfen in the amount of 0.005 weight percent to 0.10 weight percent of the composition, the texturizing agent comprises fumed silica in the amount of 0.5 weight percent to 1.0 weight percent of the composition, and the solvent comprises acetone in the amount of 91.9 weight percent to 98.495 weight percent of the composition.

16. The insecticidal composition of claim 1, wherein the polymer is in the amount of 1 weight percent to 7 weight percent of the composition, the insecticide active ingredient comprises pyriproxyfen in the amount of 0.005 weight percent to 0.10 weight percent of the composition and permethrin in the amount of 0.5 weight percent to 1.0 weight percent of the composition, the texturizing agent comprises fumed silica in the amount of 0.5 weight percent to 3.0 weight percent of the composition, and the solvent comprises acetone in the amount of 88.9 weight percent to 97.095 weight percent of the composition.

* * * * *